(12) United States Patent
Schreiber et al.

(10) Patent No.: US 10,502,110 B2
(45) Date of Patent: Dec. 10, 2019

(54) REGENERATION SYSTEM, VEHICLE COMPRISING THE SAME AND REGENERATION METHOD

(71) Applicants: HYUNDAI MOTOR COMPANY, Seoul (KR); KIA MOTORS CORPORATION, Seoul (KR)

(72) Inventors: Michael Schreiber, Frankfurt (DE); Stefan Lang, Russelsheim (DE); Andreas Kapp, Eschborn (DE)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/110,402

(22) Filed: Aug. 23, 2018

(65) Prior Publication Data

US 2019/0195104 A1    Jun. 27, 2019

(30) Foreign Application Priority Data

Dec. 27, 2017  (DE) .......................... 10 2017 223 819

(51) Int. Cl.
*G06F 7/12*        (2006.01)
*F01N 3/08*        (2006.01)

(52) U.S. Cl.
CPC ......... *F01N 3/0885* (2013.01); *F01N 3/0842* (2013.01); *F01N 2900/0422* (2013.01); *F01N 2900/10* (2013.01); *F01N 2900/1614* (2013.01)

(58) Field of Classification Search
CPC .. F01N 11/007; F01N 11/005; F01N 2260/12; F01N 2560/07; F01N 2560/08; F02B 77/086; F02D 35/0015; F02D 41/1454

USPC .......... 701/101, 108, 109, 114; 60/274, 290
See application file for complete search history.

(56) References Cited

U.S. PATENT DOCUMENTS

| 5,595,060 A   * | 1/1997 | Togai ................... F01N 3/0842 60/274 |
| 5,927,075 A   * | 7/1999 | Khair ..................... F02M 26/06 123/565 |
| 6,502,391 B1* | 1/2003 | Hirota ................... F01N 3/0814 60/288 |
| 6,779,339 B1  | 8/2004 | Laroo et al. |
| 2008/0077304 A1* | 3/2008 | Suzuki .................. F02B 37/162 701/102 |

(Continued)

FOREIGN PATENT DOCUMENTS

CN          105370353 A       3/2016
DE       102014209687 A1    11/2015

*Primary Examiner* — John Kwon
(74) *Attorney, Agent, or Firm* — Brinks Gilson & Lione (57) ABSTRACT

A regeneration system of a combustion engine of a vehicle includes a speed control device configured to determine an acceleration time of the vehicle to a set speed, a NOx trap configured to reduce nitrogen oxides produced by the combustion engine, and a trigger configured to detect a loading level of the nitrogen oxides of the NOx trap in an exhaust gas produced by the combustion engine during operation. In further, the speed control device is configured to communicate with the trigger, wherein a regeneration of the NOx trap is configured to start in case the acceleration time of the vehicle to the set speed is at least equal to a regeneration time of the NOx trap at the loading level of the nitrogen oxides.

11 Claims, 4 Drawing Sheets

(56) References Cited

U.S. PATENT DOCUMENTS

2009/0235646 A1* 9/2009 Nagaoka ............ B01D 53/9409
                                                              60/286
2010/0138100 A1   6/2010 Kim et al.

* cited by examiner

REGENERATION SYSTEM, VEHICLE COMPRISING THE SAME AND REGENERATION METHOD

CROSS-REFERENCE TO RELATED APPLICATION

This application claims priority to and the benefit of German Patent Application No. 102017223819.4, filed on Dec. 27, 2017, which is incorporated herein by references in its entirety.

FIELD

The present disclosure relates to a regeneration system of a combustion engine, in particular lean burn engines, such as diesel engines. The present disclosure relates further to a vehicle with a regeneration system as well as a regeneration method of a combustion engine of a vehicle.

BACKGROUND

The statements in this section merely provide background information related disclosure and may not constitute prior art.

Typically NOx adsorber or NOx trap (also called Lean NOx trap, abbreviated LNT) is a device that is used to reduce nitrogen oxides (NO and NO2) emissions from a lean burn internal combustion engine by means of adsorption.

Typically the lean burn engines, particularly diesel engines, present a special challenge to emission control system engineers because of the relatively high levels of $O_2$ (atmospheric oxygen) in the combustion. Because of NOx emissions from diesel engines, technologies such as exhaust gas recirculation (EGR) and selective catalytic reduction (SCR) have been used. However EGR is of limited effectiveness and SCR requires a continuous supply of reductant to the exhaust.

The so called NOx trap is used to support the NOx-aftertreatment while operation of the combustion engine.

In the past various concepts have been designed to "purge" or "regenerate" the NOx trap, whereby the use of fuel as reactants was used, for example diesel fuel. Changing an injection pattern of the combustion engine can be used to purge the NOx trap. The NOx trap can be configured to desorb and react with hydrocarbons under rich conditions to produce water and nitrogen which in general are not harmful for the environment. However, these concepts requires in general additional fuel.

Document U.S. Pat. No. 6,779,339 B1 relates to a method of treating a fuel lean exhaust containing $NO_x$ and $SO_2$. The method includes splitting the exhaust into major and minor portions for flow through multiple flow paths each of which contains a particulate trap and an absorber containing a NOx oxidation catalyst and a nitrate absorbent.

The above information disclosed in this Background section is only for enhancement of understanding of the background of the present disclosure and therefore it may contain information that does not form the prior art that is already known to a person of ordinary skill in the art.

SUMMARY

The present disclosure relates to a regeneration system, a vehicle with a regeneration system and a regeneration method.

An aspect of the present disclosure relates to a regeneration system of a combustion engine, in particular a lean burn internal combustion engine, of a vehicle. The vehicle can comprise the lean burn internal combustion engine, such as a diesel engine.

The regeneration system further comprises a speed control device configured to determine an acceleration time of the vehicle to a set speed. The acceleration time can be derived from a difference from an actual speed of the vehicle to the set speed. The set speed can be a predefined target speed of the vehicle which can be adjusted manually or automatically. The set speed can be in particular adjusted dependent on speed limits on highways or traffic situations, for example.

The regeneration system further comprises a NOx trap, also called Lean NOx trap—abbreviated LNT—or NOx adsorber. The NOx trap is configured to reduce nitrogen oxides in an exhaust gas produced by the combustion engine. That is the NOx trap is configured to adsorb and detect in particular NO and $NO_2$, the so called nitrogen oxides, produced by the combustion engine during operation. In particular the NOx trap is a device that can be used to reduce nitrogen oxides emissions from exhaust gas of the lean burn internal combustion engine by means of adsorption.

The regeneration system further comprises a trigger configured to detect a loading level of the nitrogen oxides of the NOx trap. The loading level of the trigger may show a filling level of the nitrogen oxides absorbed within the NOx trap. In particular the trigger can also detect a saturation level of the NOx trap, which in particular means that the NOx trap is in particular saturated with nitrogen oxides.

In particular, the NOx trap comprises an adsorbant as zeolite that traps the nitrogen oxides. Thus, the NOx trap may act as molecular sponge. Once the NOx trap is full at the saturation level no more NOx can be adsorbed or detected. A further regeneration at the saturation level of the NOx trap can be conducted during a usually required time. The regeneration at the saturation level can be conducted in a time range of 6 to 10 seconds, for example.

The speed control device is configured to communicate with the trigger and a regeneration of the NOx trap is configured to start in case the acceleration time of the vehicle to the set speed is at least equal to a regeneration time of the NOx trap at the loading level of the nitrogen oxides. That is that the regeneration of the NOx trap can start before reaching the saturation level of the NOx trap which can be detected by the trigger.

In particular, the described "regeneration time" comprises also the regeneration of the NOx trap before reaching the saturation level.

That is that the acceleration time of the vehicle to the set speed and the regeneration time of the NOx trap at various loading level can be simultaneously detected, wherein the regeneration of the NOx trap can already start when the saturation level of the NOx trap is not completely reached but the NOx trap can be regenerated within the acceleration time to the set speed.

One advantage is in particular that the NOx trap can be regenerated during an acceleration of the vehicle to the set speed when an upcoming acceleration of the vehicle shall take place or can be scheduled. Consequently, less fuel can be required and a lambda below one, so called rich mixtures can be efficiently provided.

In other words the fuel consumption can be efficiently reduced since the regeneration of the NOx trap can be in particular started within a desired acceleration procedure of the vehicle. That is that a waiting until the saturation level of the NOx trap is reached or during constant driving to separately or additionally operate the regeneration of the NOx trap can be efficiently reduced. Thus, according to the present disclosure the regeneration of the NOx trap can be integrated in the acceleration procedure of the vehicle which in particular reduces the fuel consumption as well as CO2 reduction, for example.

A further aspect of the present disclosure relates to a vehicle which comprises the regeneration system.

A further aspect of the present disclosure relates to a regeneration method. The regeneration method comprises a step of determining the acceleration time of the vehicle to the set speed by the speed control device.

Further the regeneration method comprises a step of reducing nitrogen oxides produced by the combustion engine by the NOx trap.

The regeneration method also comprises steps of detecting the loading level of the nitrogen oxides of the NOx trap by the trigger and conducting the communication between the speed control device and the trigger. With the term "communication", a data exchange between the speed control device and the trigger in particular with respect to the acceleration time and the loading level shall be understood. The trigger can measure the loading level of the NOx trap and can send the filling status to the speed device, wherein the speed device can send the required acceleration time to the set speed to the trigger and vice versa, for example.

The regeneration method of the combustion engine of the vehicle starts when the determined acceleration time of the vehicle to the set speed is at least equal to the regeneration time of the NOx trap at the loading level of nitrogen oxides.

The idea of the present disclosure is in particular to use an acceleration demand of the speed control device to start the regeneration of the NOx trap in connection with the loading level of the nitrogen oxides, wherein the regeneration can be conducted in a shorter time as well as at lower Δambda (or Δair-fuel ratio). The lower lambda during the acceleration decreases the Δlambda to a set value for the NOx trap regeneration.

Despite the fact that the regeneration of the NOx trap can be conducted efficiently is was surprisingly figured out that the regeneration is in particular comparable to a further regeneration during constant driving and wherein the NOx trap is saturated.

Lambda or the air-fuel ratio (AFR) is a mass ratio of air to fuel present in a combustion process such as in the internal combustion engine. The AFR is an important measure for anti-pollution and performance-tuning reasons. If exactly enough air is provided to completely burn all of the fuel, the ratio is known as the stoichiometric mixture, often abbreviated to stoich. AFR numbers lower than stoichiometric are considered "rich". Rich mixtures are less efficient, but may produce more power and burn cooler, which is kinder on the engine. AFR numbers higher than stoichiometric are considered "lean." Lean mixtures are more efficient but may cause engine damage or premature wear and produce higher levels of nitrogen oxides.

According to a form of the present disclosure, the loading level of the nitrogen oxides of the NOx trap can be bigger than 40% with respect to the saturation level. At the saturation level the NOx trap can be saturated with the nitrogen oxides. In case the loading level of the nitrogen oxides is bigger than 40% with respect to the saturation level the regeneration of the NOx trap can be efficiently conducted without the necessity of additional fuel since the regeneration starts in connection with the acceleration of the vehicle, for example. The acceleration of the vehicle can be controlled by the speed control device.

According to a further form of the present disclosure, the regeneration time of the NOx trap at the loading level of the nitrogen oxides is shorter than the further regeneration time of the NOx trap at the saturation level. The further regeneration time can be predefined in particular during constant driving. Therefore, the regeneration system can be operated in an efficient manner when the determined acceleration time of the speed control device to the set speed is shorter than the further regeneration time at the saturation level since the regeneration time is shorter and the regeneration starts in general at lower lambda values during the acceleration.

According to a further form of the present disclosure, the regeneration of the NOx trap at the loading level of the nitrogen oxides can be at least two seconds shorter than the further regeneration time of the NOx trap at the saturation level, for example during acceleration. Therefore, the fuel consumption can be efficiently reduced since the regeneration time can be shorter than the usually required regeneration time, wherein also lower lambda values are in general adjusted during the acceleration.

It is conceivable that the acceleration time of the vehicle to the set speed is one to two seconds shorter than the regeneration time, for example. That is that the regeneration of the NOx trap can be conducted using the acceleration time and the further regeneration during constant driving. It is clear that this kind of regeneration desires less fuel and the regeneration time is shorter than the further regeneration time at the saturation level of the NOx trap.

According to a further form of the present disclosure, the trigger can be configured to control the regeneration of the NOx trap before and during the acceleration time of the vehicle to the set speed. Alternatively, the trigger can also be configured to control the further regeneration time of the NOx trap at the saturation level. Therefore, the regeneration can be improved considering time and fuel saving.

According to a further form of the present disclosure, the speed control device can comprise a basic cruise control with respect to the set speed, an adaptive cruise control with respect to the set speed or an automated adaptive cruise control with respect to the set speed. The set speed can be determined by the speed limit recognized by a camera of a traffic sign recognition system of the vehicle, for example. In this context with the term "automated" an autonomous adjustment and/or readjustment to a predetermined set speed, for example 120 km/h, can be meant. Based on the basic cruise control, the adaptive cruise control and/or automated adaptive cruise control the acceleration shall be scheduled in advance based on a further vehicle in front of the vehicle or navigation data, such as speed limits. In particular the regeneration system can be efficiently adapted to an autonomous driving system of the vehicle.

In this context the basic cruise control, the adaptive cruise control and the automated cruise control can be integrated separately or in combination in the vehicle, for example.

The basic cruise control, the adaptive cruise control and/or the automated adaptive cruise control are configured to deliver the acceleration time to the trigger.

The basic cruise control comprises a control unit that can automatically control a predetermined or predefined set speed. The set speed can be determined or selected and activated or reactivated after driving the vehicle at a slower speed than the set speed in particular by a driver. The regeneration of the NOx trap can then be configured to start in case the acceleration time of the vehicle to the set speed is at least equal to a regeneration time of the NOx trap at the loading level of the nitrogen oxides, wherein the acceleration time to the set speed can be determined by the basic cruise control.

The adaptive cruise control can be a cruise control system for vehicles that automatically adjusts the vehicle speed to the set speed to maintain a safety distance from further vehicles in front of the vehicle. The adaptive cruise control can be based on sensor information of on-board sensors, for example radar sensors. By the adaptive cruise control the vehicle can be driven based on the set speed, wherein the adaptive cruise control in particular adjust a speed to an appropriate distance to the vehicle in front and the adaptive cruise control can accelerate the vehicle again to the set speed, if possible. The regeneration of the NOx trap can then be configured to start in case the acceleration time of the vehicle to the set speed is at least equal to a regeneration time of the NOx trap at the loading level of the nitrogen oxides, wherein the acceleration time to the set speed can be determined by the adaptive cruise control.

The automated adaptive cruise control can be based on the navigation data, such as speed limits and a distance between two speed limits. The regeneration of the NOx trap can then be configured to start in case the acceleration time of the vehicle to the set speed is at least equal to a regeneration time of the NOx trap at the loading level of the nitrogen oxides, wherein the acceleration time to the set speed can be determined by the automated adaptive cruise control. In this context with the term "automated" the autonomous adjustment and/or readjustment to the predetermined set speed, for example 120 km/h, can be meant.

The here described features for the regeneration system are also disclosed for the vehicle with the regeneration system as well as the regeneration method and vice versa.

DRAWINGS

For a more complete understanding of the present disclosure and advantages thereof, reference is now made to the following description taken in conjunction with the accompanying drawings. The present disclosure is explained in more detail below using exemplary forms, which are specified in the schematic figures of the drawings, in which.

The drawings and diagrams described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
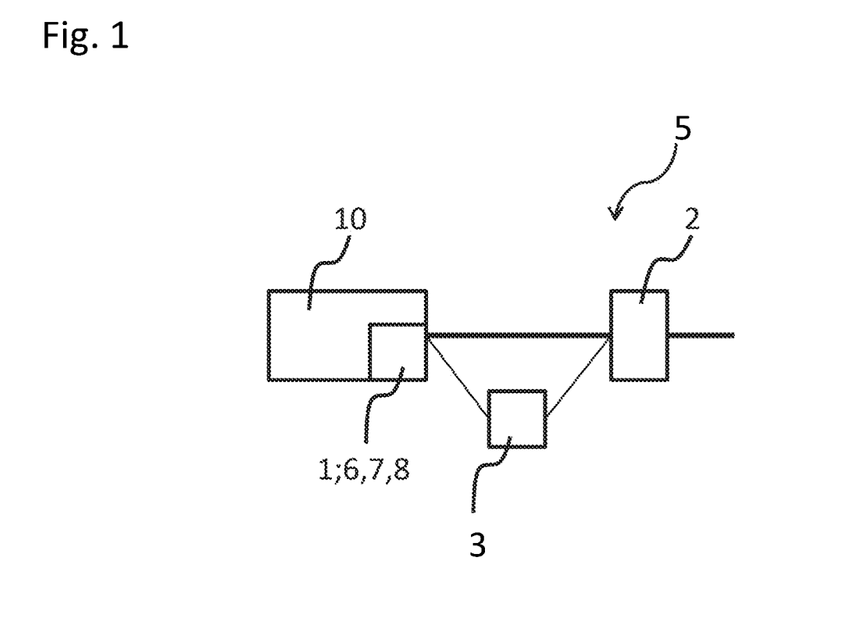
FIG. 1 illustrates a schematic view of a regeneration system according to a first form of the present disclosure.

FIG. 1 illustrates a schematic view of a regeneration system according to a first form of the present disclosure.

The regeneration system of FIG. 1 illustrates the regeneration system 5. The regeneration system 5 of a combustion engine 10 of a vehicle 20 comprises a speed control device 1 configured to determine an acceleration time of the vehicle 20 to a set speed, a NOx trap 2 configured to reduce nitrogen oxides produced by the combustion engine 10, a trigger 3 configured to detect a loading level of the nitrogen oxides of the NOx trap 2 in an exhaust gas produced by the combustion engine during operation. Further the speed control device 1 is configured to communicate with the trigger 3, wherein a regeneration of the NOx trap 2 is configured to start in case the acceleration time of the vehicle to the set speed is at least equal to a regeneration time of the NOx trap at the loading level of the nitrogen oxides.

The loading level of the nitrogen oxides of the NOx trap can be bigger than 40% with respect to a saturation level of the NOx trap.

The trigger can be configured to control the regeneration of the NOx trap before and during an acceleration of the vehicle to the set speed. Therefore, the regeneration of the NOx trap can be conducted in a fuel saving manner since the regeneration can take place during the acceleration. The trigger 3 can be therefore in steady data exchange with the speed control device 1.

The speed control device 1 can comprise a basic cruise control 6 with respect to the set speed, an adaptive cruise control 7 with respect to the set speed and/or an automated adaptive cruise control 8 with respect to the set speed.

The basic cruise control 6 can be activated by pressing a resume button. The activation of the resume button can be conducted when the vehicle 20 has a speed below the set speed. After pressing the resume button the vehicle 20 can in particular conduct a moderate acceleration from an actual speed to the set speed, wherein the set speed can be a predetermined or predefined speed. The regeneration of the NOx trap 2 can then be configured to start in case the acceleration time of the vehicle to the set speed is at least equal to a regeneration time of the NOx trap 2 at the loading level of the nitrogen oxides, wherein the acceleration time to the set speed can be determined or calculated by the basic cruise control.

The adaptive cruise control 7 can be in particular controlled based on sensor information from on-board sensors, such as radar sensors. By using the adaptive cruise control 7 the driver can input the set speed. In case that no further vehicle or object is in front of the vehicle, the vehicle 20 can maintain the set speed, wherein the set speed can be the predetermined or predefined speed. In case that the further vehicle is in front of the vehicle 20 the adaptive cruise control 7 adjust the speed of the vehicle 20 to an appropriate distance with respect to the further vehicle. In case the vehicle 20 can be accelerated to the set speed, for example if the further vehicle left a highway the adaptive cruise control 7 can accelerate the vehicle 20 to the set speed. The regeneration of the NOx trap 2 can then be configured to start in case the acceleration time of the vehicle 20 to the set speed is at least equal to a regeneration time of the NOx trap 2 at the loading level of the nitrogen oxides, wherein the acceleration time to the set speed can be determined by the adaptive cruise control of the speed control device 1.

The automated adaptive cruise control 8 can be based on navigation data, such as speed limits and a distance between two speed limits. The regeneration of the NOx trap can then be configured to start in case the acceleration time of the vehicle to the set speed is at least equal to a regeneration time of the NOx trap 2 at the loading level of the nitrogen oxides, wherein the acceleration time to the set speed can be determined by the automated adaptive cruise control. In this context with the term "automated" an automated adjustment and/or readjustment to a predetermined set speed, for example 120 km/h, can be meant.

Thus, the regeneration is conducted while the acceleration of the vehicle takes place. In other words an additional further regeneration during constant drive can be reduced. The required fuel for the regeneration can be therefore about 60% less than during a further regeneration besides the acceleration of the vehicle.

A time range for the further regeneration time is about 6 seconds.

Figure 2:
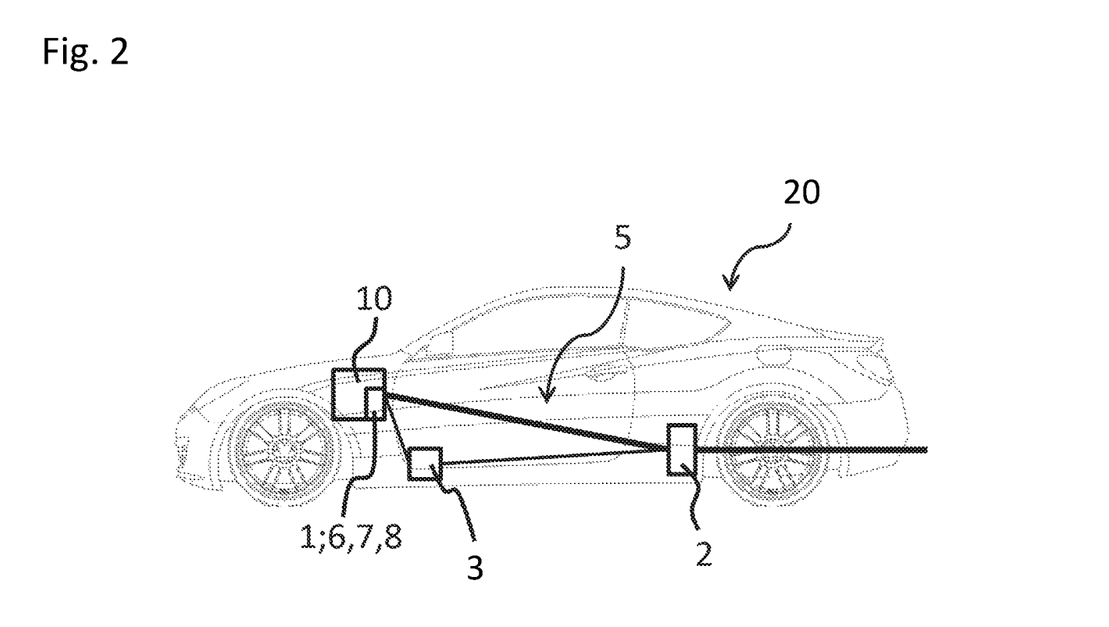
FIG. 2 illustrates a schematic side view of a vehicle according to a first form of the present disclosure.

FIG. 2 illustrates a schematic side view of a vehicle according to a first form of the present disclosure.

FIG. 2 illustrates the vehicle 20, in particular an automobile. The automobile comprises the here described regeneration system 5.

Figure 3A:
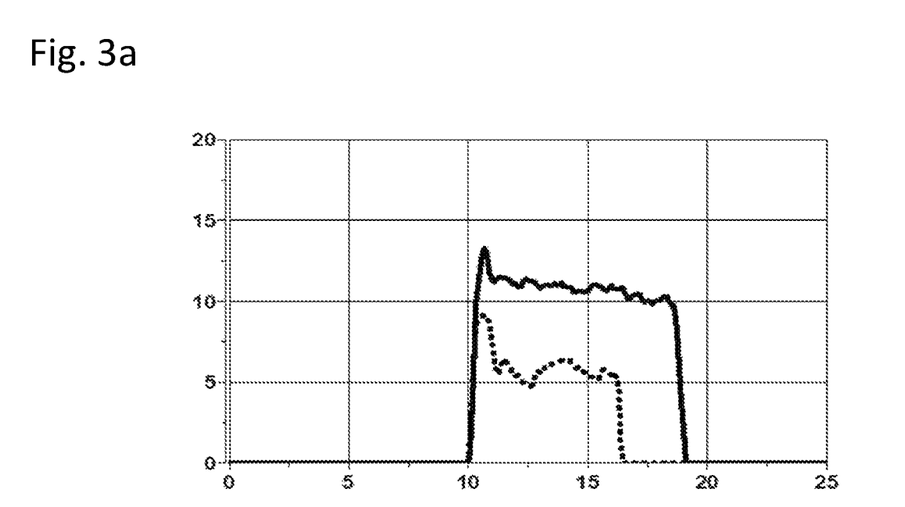
FIGS. 3a and 3b show graphs to explain the technical effects of the regeneration system according to FIG. 1.
Figure 3B:
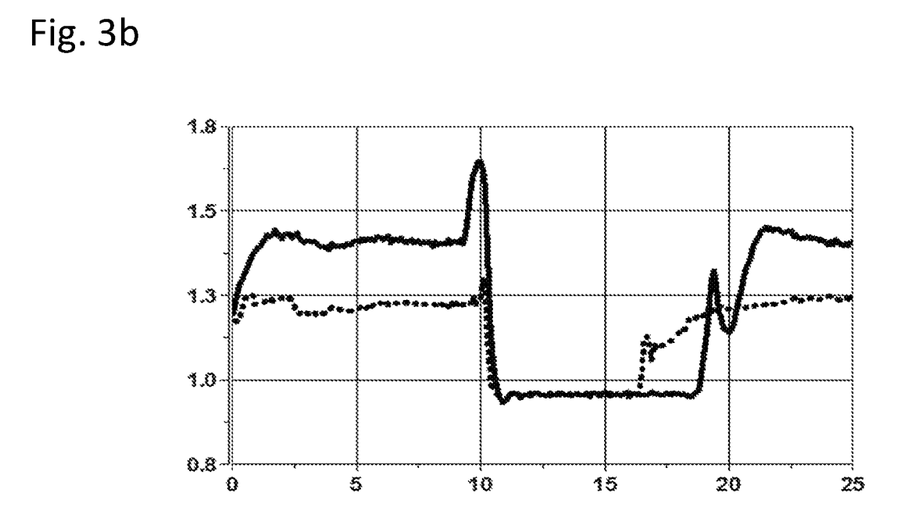

FIGS. 3a and 3b show graphs to explain the technical effects of the regeneration system according to FIG. 1.

In FIGS. 3a and 3b a time range between 0 and 25 seconds are applied on the X-axis.

In FIG. 3a an additional fuel quantity between 0 and 20 mg/str are applied on the Y-axis.

In FIG. 3b an lambda value between 0.8 and 1.8 are applied on the Y-axis.

A solid line shows the further regeneration during constant drive and a dotted line shows the regeneration during the acceleration of the vehicle 20.

As can be seen in FIG. 3a additional fuel quantity for the further regeneration of the NOx trap is required and a further regeneration time is longer than during the acceleration of the vehicle 20. For example, the regeneration time during the acceleration is about 2 seconds shorter compared to the further regeneration during constant drive and fuel can be saved in a range between 60% and 70%. In other words the regeneration can be about 25% shorter in time and 35% lower additional peak fuel quantity can be needed, for example.

As can be seen in FIG. 3b higher lambda values during constant driving requires higher fuel amount to decrease the lambda value below one for the further regeneration of the NOx trap compared to the regeneration during the acceleration. Due to the lower lambda value during the acceleration compared to constant driving a requirement of additional fuel injection and throttling of the fresh air for the regeneration of the NOx trap can be significantly lower, for example about 0.2.

Despite the fact that the regeneration of the NOx trap can be conducted efficiently is was surprisingly figured out that the regeneration is in particular comparable to the further regeneration during constant driving. Further the reduction of fuel consumption can be accompanied by a reduction of $CO_2$.

Figure 4:
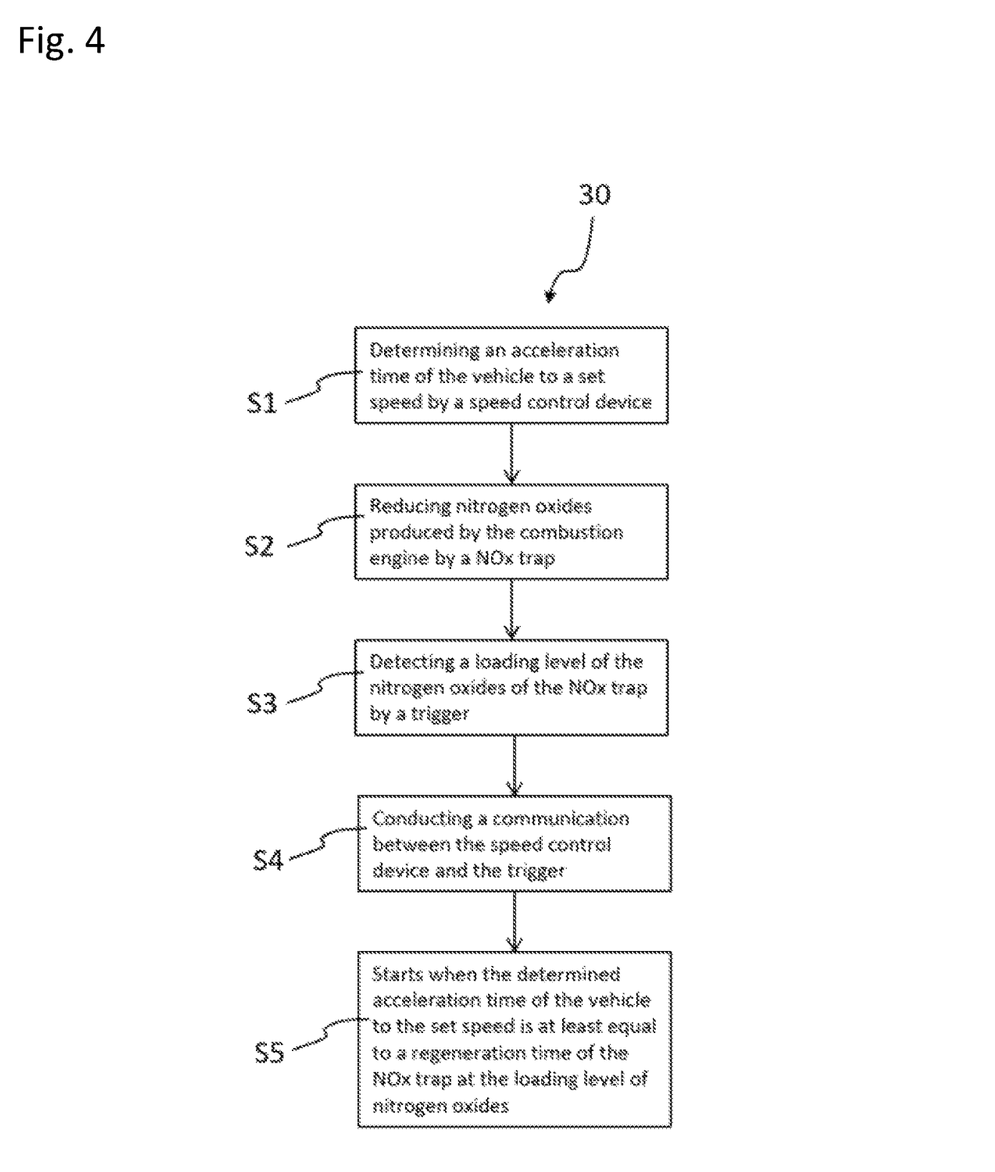
FIG. 4 shows a flow diagram of a regeneration method according to a first form of the present disclosure.

FIG. 4 shows a flow diagram of a regeneration method according to a first form of the present disclosure.

The regeneration method 30 of the combustion engine 10 for the vehicle 20 comprises a step of determining S1 the acceleration time of the vehicle 20 to the set speed by the speed control device 1.

Further the regeneration method comprises a step of reducing S2 nitrogen oxides produced by the combustion engine 10 by the NOx trap 2.

The regeneration method 30 also comprises steps of detecting S3 a loading level of the nitrogen oxides of the NOx trap 2 by the trigger 3 and a step of conducting S4 a communication between the speed control device 1 and the trigger 3. With the term "communication" a data exchange between the speed control device 1 and the trigger 3 in particular with respect to the acceleration time and the loading level shall be understood. The trigger 3 can measure the loading level of the NOx trap 2 and can send a filling status of the NOx trap 2 to the speed control device 1, wherein the speed control device 1 can send the required acceleration time to the set speed to the trigger 3 and vice versa, for example.

The step of regeneration S5 starts when the determined acceleration time of the vehicle 20 to the set speed is at least equal to a regeneration time of the NOx trap 1 at the loading level of nitrogen oxides.

Figure 5:
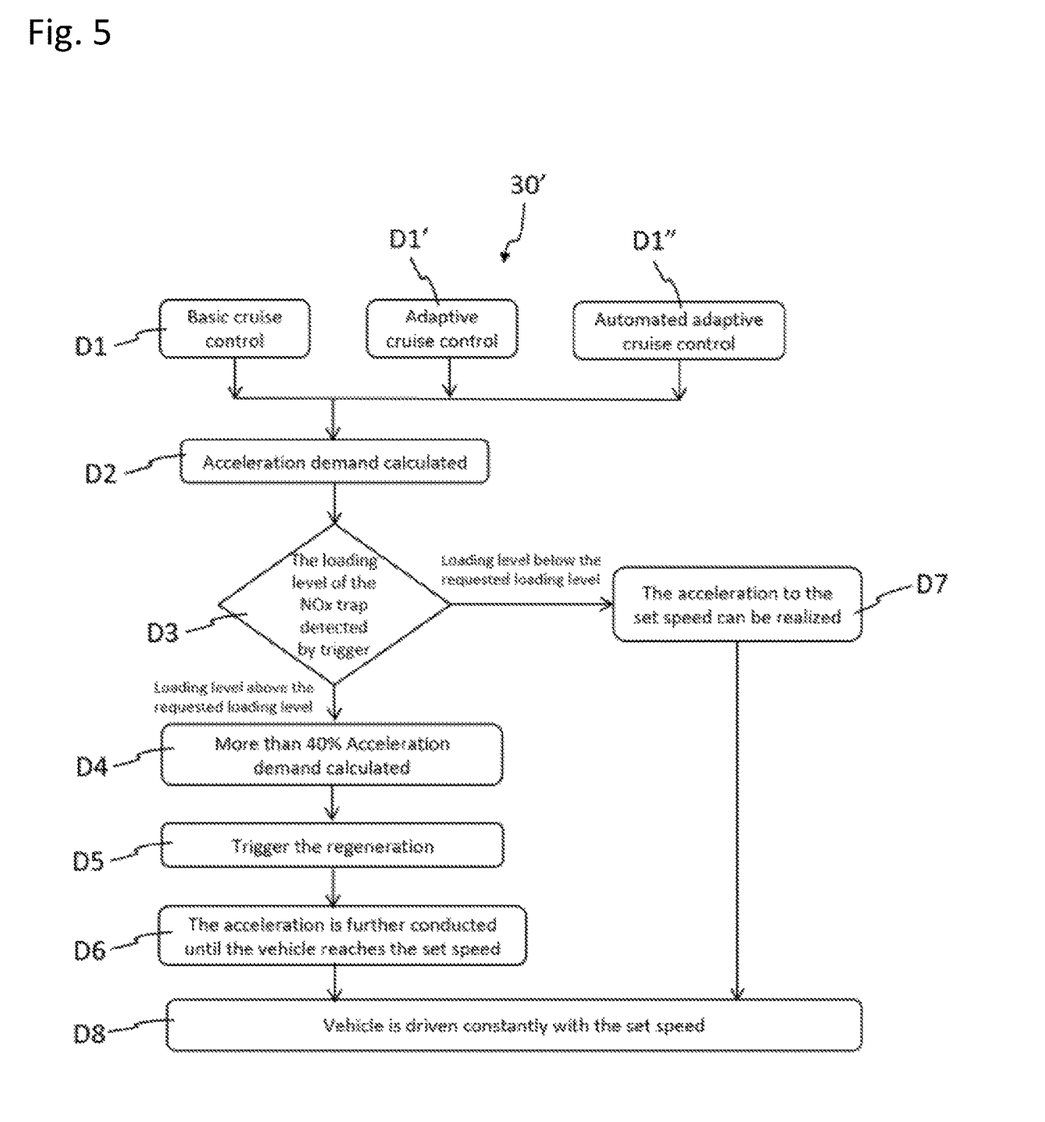
FIG. 5 shows a detailed flow diagram of a regeneration method based on FIG. 4.

FIG. 5 shows a detailed flow diagram of a regeneration method based on FIG. 4.

FIG. 5 is based on FIG. 4, wherein the regeneration method is explained in detail with respect to the speed control device 1. The detailed regeneration method 30' is based on the regeneration method 30.

The set of determining S1 the acceleration time of the vehicle 20 to the set speed by the speed control device 1 can be conducted by the basic cruise control D1, the adaptive cruise control D1' and/or the automated adapted cruise control D1". In step D2 the acceleration demand can be calculated. In step D3 the loading level of the NOx trap can be detected by the trigger. In case the loading level is below a requested loading level with respect to the saturation level of the NOx trap a standard acceleration without the regeneration can be conducted and the acceleration D7 to the set speed can be realized, for example by the basic cruise control D1, the adaptive cruise control D1' and/or the automated adapted cruise control D1" of the speed control device 1. In step D8 the vehicle 20 can be driven constantly with the set speed.

In case the loading level is above the requested loading level with respect to the saturation level of the NOx trap, for example more than 40% the regeneration D4 during the acceleration can be conducted. The trigger 3 therefore triggers the regeneration in step D5. After the regeneration of the NOx trap 2 the acceleration can be further conducted until the vehicle 20 reaches the set speed in step D6. In step D8 the vehicle 20 can be driven constantly with the set speed.

Although the here afore-mentioned fuel supply module has been described in connection to automobiles, accordingly. For a person skilled in the art it is clearly and unambiguously understood that the here described fuel supply module can be applied to various objects which comprise combustion engines.

Although specific variations have been illustrated and described herein, it will be appreciated by those of ordinary skill in the art that a variety of alternate and/or equivalent implementations exist. It should be appreciated that the exemplary form or exemplary forms are only examples, and are not intended to limit the scope, applicability, or configuration in any way. Rather, the foregoing summary and detailed description will provide those skilled in the art with a convenient road map for implementing at least one exemplary form, it being understood that various changes may be made in the function and arrangement of elements described in an exemplary form without departing from the scope as set forth in the appended claims and their legal equivalents. Generally, this application is intended to cover any adaptations or variations of the specific forms discussed herein.

What is claimed is:
1. A regeneration system of a combustion engine of a vehicle comprising:

a speed control device configured to determine an acceleration time of the vehicle to a set speed;
a NOx trap configured to reduce nitrogen oxides produced by the combustion engine; and
a trigger configured to detect a loading level of the nitrogen oxides of the NOx trap,
wherein the speed control device is configured to communicate with the trigger, and
wherein a regeneration of the NOx trap is configured to start in case the acceleration time of the vehicle to the set speed is at least equal to a regeneration time of the NOx trap at the loading level of the nitrogen oxides.

2. The regeneration system according to claim 1, wherein the loading level of the nitrogen oxides of the NOx trap is bigger than 40% with respect to a saturation level of the NOx trap.

3. The regeneration system according to claim 2, wherein the regeneration time of the NOx trap at the loading level of the nitrogen oxides is shorter than a further regeneration time of the NOx trap at the saturation level.

4. The regeneration system according to claim 3, wherein the regeneration time of the NOx trap at the loading level of the nitrogen oxides is at least two seconds shorter than the further regeneration time of the NOx trap at the saturation level.

5. The regeneration system according to claim 1, wherein the trigger is configured to control the regeneration of the NOx trap before and during an acceleration of the vehicle to the set speed.

6. The regeneration system according to claim 1, wherein the speed control device comprises a basic cruise control with respect to the set speed, an adaptive cruise control with respect to the set speed and/or an automated adaptive cruise control with respect to the set speed.

7. The regeneration system according to claim 1, wherein a vehicle comprises the regeneration system.

8. A regeneration method of a combustion engine of a vehicle, the method comprising:
determining an acceleration time of the vehicle to a set speed by a speed control device;
reducing nitrogen oxides produced by the combustion engine by a NOx trap;
detecting a loading level of the nitrogen oxides of the NOx trap by a trigger; and
conducting a communication between the speed control device and the trigger,
wherein a regeneration of the NOx trap starts when the determined acceleration time of the vehicle to the set speed is at least equal to a regeneration time of the NOx trap at the loading level of nitrogen oxides.

9. The regeneration method according to claim 8, wherein the regeneration of the NOx trap is controlled by the trigger before and during an acceleration of the vehicle to the set speed.

10. The regeneration method according to claim 8, wherein the step of determining the acceleration time of the vehicle to the set speed by the speed control device is conducted by a basic cruise control with respect to the set speed, an adaptive cruise control with respect to the set speed or an automated adaptive cruise control with respect to the set speed.

11. The regeneration method according to claim 8, wherein the regeneration of the NOx trap at the loading level of the nitrogen oxides is executed at least two seconds faster than a further regeneration time of the NOx trap at a saturation level.

* * * * *